United States Patent [19]

Russell

[11] 3,885,094

[45] May 20, 1975

[54] OPTICAL SCANNER

[75] Inventor: James T. Russell, Richland, Wash.

[73] Assignee: Battelle Development Corporation, Columbus, Ohio

[22] Filed: Oct. 12, 1973

[21] Appl. No.: 405,770

Related U.S. Application Data

[60] Division of Ser. No. 202,471, Nov. 26, 1971, Pat. No. 3,806,643, which is a continuation-in-part of Ser. No. 857,474, Sept. 12, 1969, Pat. No. 3,624,284, which is a division of Ser. No. 576,580, Sept. 1, 1966, Pat. No. 3,501,586.

[52] U.S. Cl. .................................................. 178/7.6
[51] Int. Cl. .............................................. H04n 1/24
[58] Field of Search................. 178/7.6, 6.7 R, 6.7 A

[56] References Cited

UNITED STATES PATENTS

| | | | |
|---|---|---|---|
| 3,501,586 | 3/1970 | Russell | 178/6.7 |
| 3,624,284 | 11/1971 | Russell | 178/6.7 |

*Primary Examiner*—Howard W. Britton
*Assistant Examiner*—Michael A. Masinick
*Attorney, Agent, or Firm*—Klarquist, Sparkman, Campbell, Leigh, Hall & Whinston

[57] ABSTRACT

An electrical signal recording and playback system is described in which an analog input signal is converted to a digital signal that pulses a light source to form a single, series-recorded track of binary coded digital information including information spots arranged in groups separated by synchronizing spots recorded on a photographic film which is played back in a similar manner. The photographic film is a compact, permanent record of long, useful lifetime which may be photographically copied to provide a plurality of inexpensive copies. A spiral track photographic record is used in one embodiment which can be employed to provide a music system of high quality. In one embodiment, a photographic record having bits arranged in lines or columns is held in a fixed position and a fan-shaped laser beam is moved horizontally over the record in a primary scan, and a row of microlenses focus line segments of the columns in seriatim on a row of photocells, the microlenses being stepped vertically from line to line in a vertical secondary scanning. In another embodiment, a laser beam is scanned horizontally and vertically to illuminate pages of information on a photographic element one after another, and, during the illumination of the pages, a matrix of lenslets, each covering one page, is scanned vertically over the height of a page, to transmit the lines of the illuminated pages seriatim to a row of photocells.

5 Claims, 13 Drawing Figures

OPTICAL SCANNER

CROSS-REFERENCE TO RELATED APPLICATION

This is a divisional application of copending U.S. application Ser. No. 202,471 filed Nov. 26, 1971, by James T. Russell entitled "Photographic Records of Digital Information and Playback Systems including Optical Scanners", now U.S. Pat. No. 3,806,643, which is a continuation-in-part of application Ser. No. 857,474, filed Sept. 12, 1969, by James T. Russell entitled "Photographic Record of Digital Information and Playback System Including Optical Scanner", now U.S. Pat. No. 3,624,284, the latter being a divisional application of application Ser. No. 576,580 filed Sept. 1, 1966, by James T. Russell entitled "Analog to Digital to Optical Photographic Recording and Playback System", now U.S. Pat. No. 3,501,586.

BACKGROUND OF THE INVENTION

The subject matter of the present invention relates generally to the storage and retrieval of digital information at extremely high densities, and in particular to a photographic record of digital information formed by an optically recording electrical input signal as a single track of digital information spots and playback apparatus for optically playing back the recorded digital information with a fixed light detector which is scanned across the fixed record by a light deflection means such as a moving mirror optical scanner.

Briefly, one embodiment of a system in accordance with the present invention includes a recorder unit by which an analog input signal is converted into a digital electrical signal which pulses a single light that is optically scanned across a photosensitive plate to record the pulses of such digital signal in series as a single track of digitally coded information spots arranged in groups separated by synchronizing spots distinguishable from such information spots. A playback unit is then employed to optically scan the photo record of the recorded digital signal with a photocell to produce a digital electrical readout signal and to convert such digital readout signal into an analog output signal that is an accurate reproduction of the analog input signal.

The apparatus of the present invention is especially useful for recording and playing back audio-visual analog signals, such as television video signals, high fidelity music audio signals, and other electrical analog signals. However, it is also possible to employ the present apparatus as part of any information storage and retrieval system including a digital computer system, such as typically used for data processing purposes, a character recognition system or a photograph inspection system in which the input signal is a light signal which is converted into a digital electrical signal that is optically recorded and played back by the apparatus of the present invention.

Previous attempts to optically record and/or play back an audio signal by means of a light beam have been commercially unsuccessful. Some of these prior apparatus have employed a light beam and photocell merely to play back a conventional phonograph record by reflecting light from the groove of such record, as shown in U.S. Pat. No. 3,138,669 of J. Rabinow et al. Recently attempts have also been made to record an audio signal by means of a light beam as a photographic track of varying light density, as well as optically playing back the photographic record so produced as shown in U.S. Pat. No. 3,251,952 of A. Shomer. However, in both instances an analog signal, rather than a digital signal, is recorded so that the amount of information which can be stored, as well as the quality of the signal reproduced during playback, is severely limited. It has been discovered that these disadvantages can be overcome if the analog signal is first converted into a digital signal before optically recording such signal as a track of light spots on a photosensitive medium in accordance with the present invention.

It has also previously been proposed to optically record and play back digitally encoded information on a photographic film to improve the transmission of speech signals over telephone lines by means of pulse code modulation, as shown in U.S. Pat. No. 2,595,701 of R. K. Potter. However, this system employs a plurality of light sources which are selectively energized by means of an electronic switching device in the form of a cathode ray tube so that the resulting photograph has a very low information density, which necessitated the use of a moving film strip as the photosensitive record. This disadvantage has been overcome in the apparatus of the present invention by employing a single pulsed light source focused to an extremely small focal spot, for example of about 1/300 millimeter in diameter, which is optically scanned across the photosensitive recording medium to produce a track of digitally recorded light spots having a very high density of up to approximately $5 \times 10^{+7}$ bits per square inch.

The information storage and retrieval systems of the present invention have several advantages over systems previously employed. Thus, the present apparatus are less expensive than the video signal magnetic tape recording equipment. Also, they produce a photograph type of record which can be easily reproduced inexpensively to provide high quality copies and which has a much longer useful lifetime than magnetic tape or phonograph records. In addition, the present digital coded photographic record is capable of storing a larger amount of information in a smaller space. Furthermore, by employing a digital light signal to photographically record the information, the present apparatus provides a much higher signal-to-noise ratio in the analog output signal to enable a better quality reproduction of the analog input signal. Also, the analog output signal quality is more consistent because it is less dependent upon the recording medium, or the frequency response of the recording and playback devices. In addition, the present photographic records may be produced on flat plates which enables the use of an automatic record changing device similar to that used on a photo slide projector or phonograph.

It is therefore one object of the present invention to provide an improved information storage and retrieval system for optically recording and playing back digitally encoded electrical signals on a photosensitive medium at an extremely high information density.

Another object of the present invention is to provide a system for converting an analog input signal into a digitally encoded electrical signal and photographically recording such digital signal with a pulsed light source focused to a very small focal spot, and the optically scanning the resulting photograph with a light detector to produce a digitally encoded electrical readout signal which is subsequently converted into an analog output signal that has a high signal-to-noise ratio and is a high quality reproduction of the analog input signal.

A further object of the present invention is to provide an improved digital signal recorder unit for optically recording a digitally encoded electrical signal on a photosensitive medium in the form of a single track of a series of light spots of extremely small size and high density per unit area.

Still another object of the present invention is to provide an improved optical scanner apparatus employing a rotating mirror which is radially deflected electromagnetically and by centrifugal force in order to provide a spiral shaped scan pattern and which is capable of scanning a flat photographic element while maintaining the optical path length substantially constant at all times during the scan.

An additional object of the present invention is to provide an improved digital signal playback unit for optically scanning a photograph of a track of digitally encoded spots with a light detector to produce an electrical digital readout signal corresponding thereto in an accurate and inexpensive manner.

A still further object of the present invention is to provide a photographic record element having a track of digitally encoded light spots recorded thereon at an extremely high density to provide a record which is inexpensive, compact, of long useful lifetime, and easily reproduced to provide copies of very high quality.

Another object of the invention is to provide an information storage and retrieval system in which a photographic record stores digital information in a high density manner in which bits are arranged in lines spaced apart vertically and divided horizontally into segments to form columns or pages.

Another object of the invention is to provide an information storage and retrieval system in which primary scanning of a fixed photographic record is effected by a light beam and secondary scanning is effected by a lens matrix.

Another object of the invention is to provide an information storage and retrieval system in which a fixed photographic record is scanned horizontally by a fan-shaped light beam which illuminates columns of bits in line segments seriatim, and a row of lenses each behind one of the columns focuses light from the line segments seriatim to a row of photocell elements, and is stepped to vertically scan the columns.

Another object of the invention is to provide an information storage and retrieval system in which primary vertical and horizontal scanning is effected by a light beam which illuminates one-at-a-time pages arranged along coordinates of a fixed photographic record and a matrix of microlenses, one lens behind each page, is moved vertically to vertically scan each page, the lens behind the illuminated page focusing images from one line of that page on a row of photocell elements.

Figure 1:
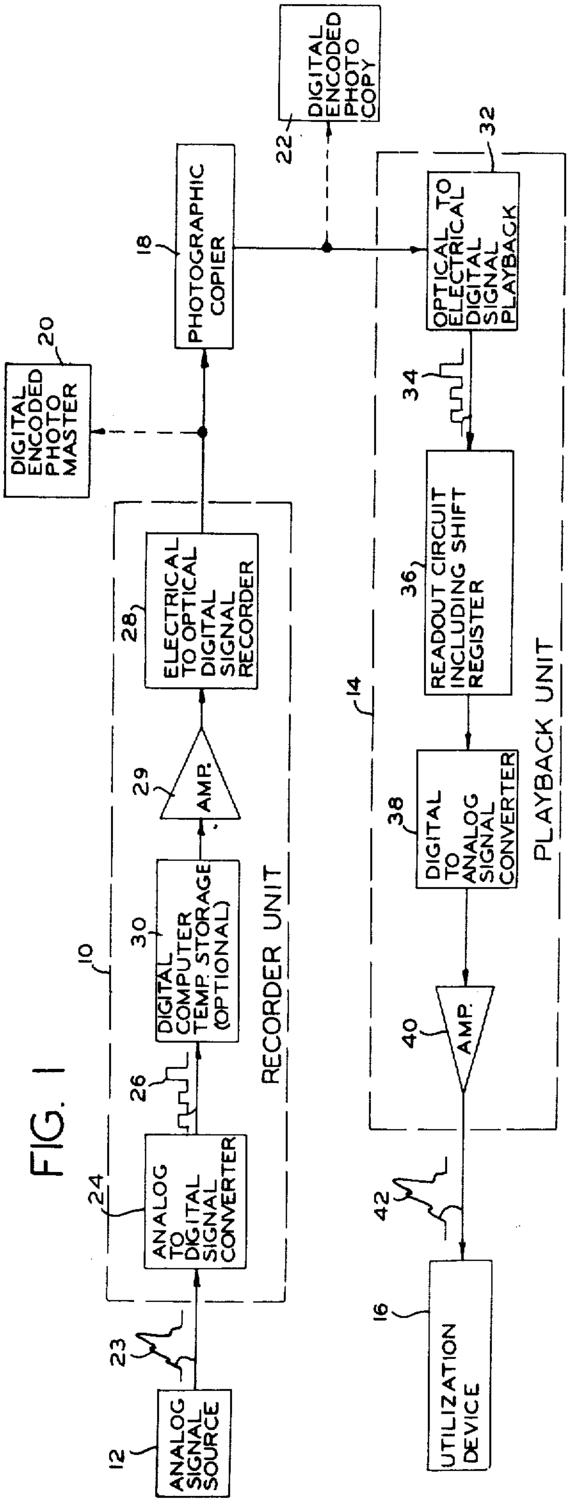
FIG. 1 is a block diagram of the analog to digital to optical recording and playback system forming one embodiment of the invention.

As shown in FIG. 1, the information storage and retrieval system of the present invention includes a recorder unit 10 having its input connected to an audio-visual analog signal source 12, such as a microphone or television camera, and a playback unit 14 having its output connected to an analog signal utilization device 16, such as a loud speaker, television receiver, cathode ray oscilloscope, mechanical recorder, etc. In addition, a photographic copier 18 of any suitable type, such as that capable of making contact prints, may be provided so that a single digitally encoded photomaster 20 produced by the recorder unit 10 may be inexpensively copied and reproduced as a plurality of digitally encoded photocopies 22 which are employed as the information input to the playback unit 14. In this regard, the system of the present invention is similar to that of a commercial phonograph recording apparatus which produces a large number of phonograph records from a single master so that such copy records may be sold to the consumer at a relatively low cost.

The signal source 12 produces an audio-visual analog input signal 23 which may be an audio high fidelity music signal or a video television signal. This analog input signal is applied to the input of an analog to digital signal converter 24 provided in the recorder unit 10 and which produces a digitally encoded electrical output signal 26. However, it is also possible that the signal source 12 and the converter 24 may be of the type which convert a light analog input signal into a digital electrical output signal, such as is employed in character recognition systems and aerial photograph analyzers. The digital signal 26 is produced by conventional pulse code modulation in the form of a plurality of pulses separated into groups or "words" of pulses, each group corresponding to the instantaneous amplitude of a different portion of the analog input signal 23. The output of the analog to digital signal converter 24 may be directly connected to an electrical to optical digital signal recorder 28 through an amplifier 29 if it is desired to record the digital signal in real time simultaneously as it is generated. However, it may be desirable to temporarily store the digital signal 26 on the magnetic tape of a digital computer 30 and to record such signal later at a more convenient time. Thus, it can be seen that the digital computer 30, connected between signal converter 24 and amplifier 29, is an optical part of the recorder unit.

The electrical to optical digital signal recorder 28 converts the digital electrical signal into a digital light signal and photographically records such light signal by scanning a pulsed light beam of small focal spot size over a photosensitive element to produce a track of digitally encoded spots of less than about 0.01 millimeter in diameter. When a binary digital signal is employed, the spots may be light opaque or light transparent to provide the 0 and 1 bit of the binary code. It should be noted, however, that other digital encoded signals can be employed, such as a ternary digital system employing transparent, partially transparent and opaque dots on black and white film, and the like.

The playback unit 14 includes an optical to electrical digital signal playback apparatus 32 which scans a photocell across the digitally encoded photocopy 22 to produce a digitally encoded electrical signal 34 corresponding to the photograph of digitally encoded light spots. Thus the digital output signal 34 corresponds to the digital input signal 26 supplied to recorder 28. While the optical playback apparatus 32 is shown separate from the optical recorder apparatus 28, it may employ the same optical scanner and merely substitute a photocell in place of the pulsed light source used in such recorder. The optical playback apparatus 32 is connected through an electrical readout circuit 36 including a shift register to a digital to analog signal converter 38. The output of the signal converter 38 is connected to the utilization device 16 through an amplifier 40 so that an analog output signal 42, produced by such signal converter in response to digital signal 34, is applied to the utilization device. Thus, the analog output signal 42 is a high quality reproduction of the analog input signal 23, such output signal having a high signal-to-noise ratio and very little distortion. This high quality signal reproduction and the high information density on the photographic record are due to the fact that the grain size and the nonlinear optical density curves of photosensitive materials do not limit the recorded information density of digital signals as they do with analog signals.

Figure 2:
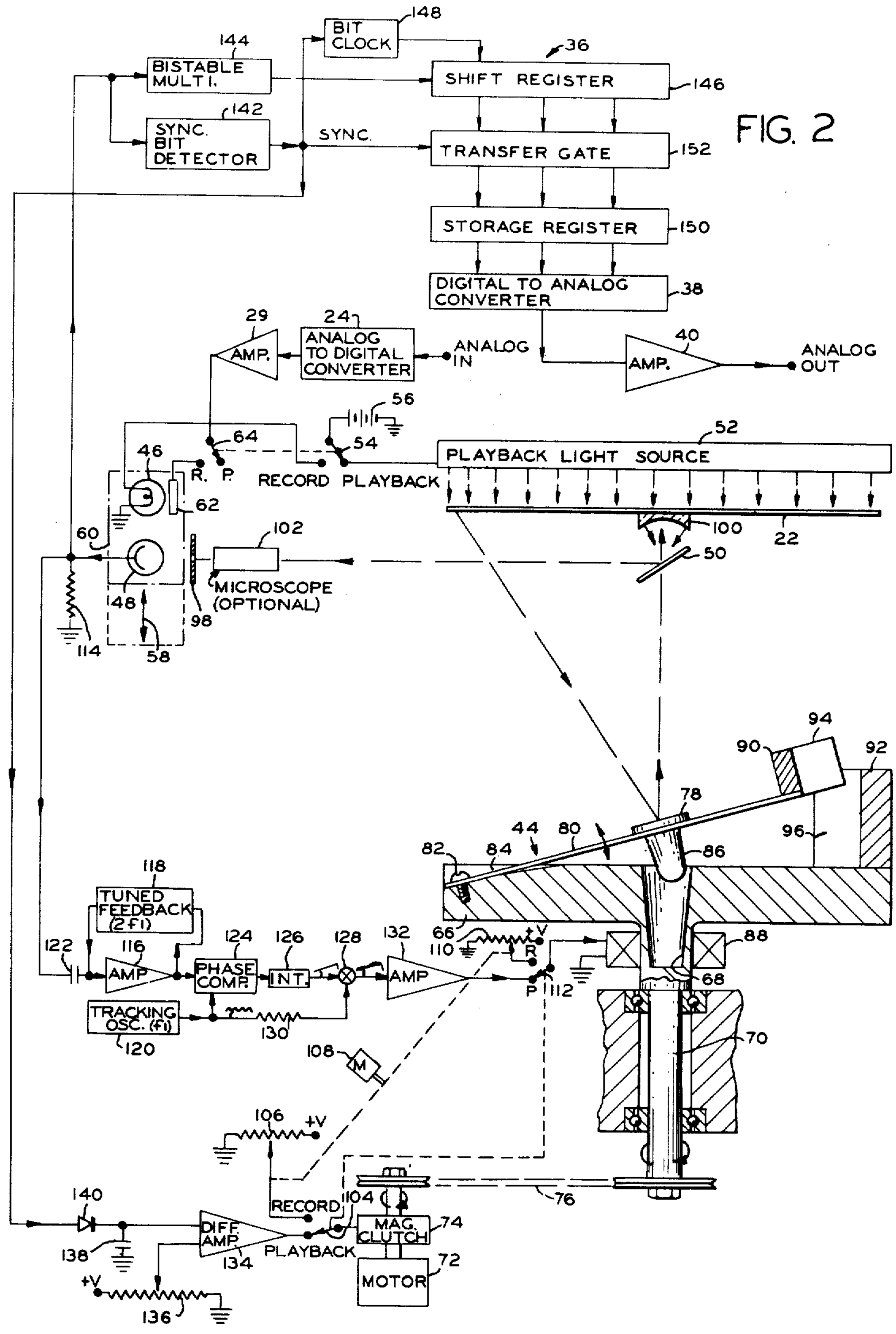
FIG. 2 is a partially schematic diagram of one embodiment of the system of FIG. 1, which employs an optical scanner having a magnetically deflected rotating mirror.

As shown in FIG. 2, one embodiment of the recording and playback system of FIG. 1 may employ the same optical scanner apparatus 44 for both the optical recorder 28 and the optical playback apparatus 32 merely by moving either a recording light source 46 or a photocell 48 into alignment with a beam splitting mirror 50 employed with such apparatus. The recording light source is a single light source of high intensity and small area, such as an arc lamp or a laser. In addition, a playback light source 52 of large area, which may be a bank of fluorescent lights, is positioned behind the digital encoded photocopy 22 and selectively energized by a switch 54 connected to a source of electrical power 56 which is represented by a battery but may actually be any D.C. voltage source, in the "playback" position of such switch. It should be noted that while the playback light source 52 is shown transmitting light through the digitally encoded photocopy 22, it may be reflected from such photocopy if the light source is positioned in front of the photocopy out of the path of the scanning light beam, such as by employing a circular fluorescent lamp surrounding the photocopy. In the "record" position of switch 54, the recording light source 46 is energized to enable recording of the digital information, when the light source is moved in the direction of arrows 58 into the position occupied by the photocell 48, by the downward movement of a carriage 60 supporting both such light source and photocell.

While the digital encoded input signal produced by signal converter 24 of the record unit 10 may instead be applied directly to the light source 46, such signal is shown being applied to an electronic shutter 62 in front of such light source to produce a beam of light pulses. Shutter 62 may be a Kerr cell which contains nitrobenzene liquid, or may be a series of crystals of potassium dihydrogen phosphate, both such Kerr cell and such crystals having the property of electric double refraction. Thus, shutter 62 is connected to the output of amplifier 29 by a two position selector switch 64 whose movable contact is ganged to that of switch 54 so that such switch is open in the playback position shown and closed in the record position. If such a shutter is employed, light source 46 may be a continuously operating laser to provide an intense source of collimated monochromatic light.

The optical scanner apparatus 44 includes an annular support plate 66 of aluminum or other nonmagnetic material having an axially extending cavity 68 and which is mounted for rotation on shaft 70. The shaft 70 is rotated about a vertical axis by a constant speed electric motor 72 which is connected through a magnetic clutch 74 and a belt drive 76 to such shaft. A flat mirror element 78 is attached to the upper side of a leaf spring 80 intermediate the ends of such spring and one end of the spring is fixed to the periphery of the support plate 66 by a screw 82 or other suitable means. Spring 80 extends through a guide slot 84 provided in the upper surface of plate 66 and intersects the axis of rotation of shaft 70 so that the center of the scanning mirror 78 is positioned generally on such axis of rotation. A solenoid element 86 of magnetic material is attached to the bottom side of the spring 80 beneath mirror 78 in position to be inserted into the cavity 68 in support plate 66 when such spring is deflected downward. Both cavity 68 and solenoid element 86 are of a frustoconical shape. An electromagnetic coil 88 is positioned about the shaft of the rotating support plate 66 adjacent the bottom of cavity 68 so that when an electrical signal is applied to such coil the solenoid element 86 is attracted into such cavity or repelled out of the cavity due to the magnetic field produced by such coil. This causes deflection of the spring 80 and radial scanning movement of the mirror 78 over the digitally encoded photocopy 22.

In addition, a weight 90 is attached to the free end of the spring 80 in order to cause such spring to deflect downwardly due to the centrifugal force on such weight when the speed of rotation of support plate 66 is increased. In order to dampen the oscillations of spring 80, a slotted permanent magnet 92 is attached to the upper surface of the rotating support plate 66 and a thin vane 94 of electrically conductive material provided on the end of weight 90 is positioned within the slot 96 of such magnet so that such vane moves up and down between the north and south poles of the magnet, which produce eddy currents in vane 94 to cause a damping action. In place of such permanent magnet damping, it is also possible to employ oil damping by filling cavity 68 with oil so that solenoid element 86 operates in the manner of a dash pot.

As stated previously, a beam splitter mirror 50 which transmits about 50 percent and reflects about 50 percent of the light directed onto such splitter, is positioned at an angle of 45° with respect to the axis of rotation of shaft 70 and with respect to the axis of the light path between such mirror and an apertured light mask 98 positioned in front of the photocell 48 or the light source 46, 62. A spherical mirror 100 is positioned between the beam splitter 50 and the center of the photosensitive element 22. In addition, a light microscope 102 may be provided between the mask 98 and the beam splitter 50 in order to focus the light source into a small diameter spot on the record element 22 or to limit the viewing field of the detector to such a small spot. However, the microscope is optional and may not be necessary. Also it is possible to employ an objective lens between the microscope 102 and the beam splitter 50 in which case the spherical mirror 100 can be eliminated and the beam splitter rotated ninety degrees.

Figure 5A:
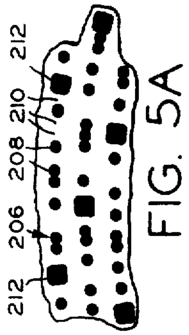
FIG. 5A is an enlarged view of a portion of the record element of FIG. 5.
Figure 5:
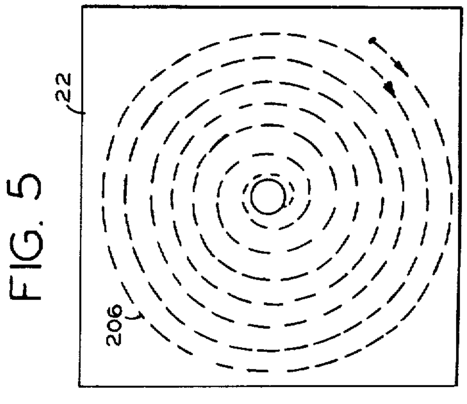
FIG. 5 is a plan view of one embodiment of a photographic record element having a spiral track of digitally encoded spots thereon, which is produced by the apparatus of FIG. 2.

During the recording operation of the apparatus of FIG. 2, the carriage 60 is moved downward into the lower position so that light source 46 is in alignment with the aperture in mask 98, and switch 54 is moved to the record position to energize such light source and to turn off playback light source 52. In addition, switch 64 is moved to the record position "R" to connect the electronic shutter 62 to the analog to digital converter 24, so that digitally encoded pulses are applied to such shutter through amplifier 29 to provide a plurality of light pulses. These digitally coded light pulses are transmitted to beam splitting mirror 50, which reflects approximately 50 percent of the light to the spherical mirror 100, which focuses and again reflects this light to transmit 25 percent of the light through beam splitter 50 onto the scanning mirror 78. The light pulses are then reflected by the scanning mirror 78 onto the photosensitive element which in this case would be the photomaster 20 in place of the photocopy 22 shown. The scanning mirror 78 is rotated about the axis of shaft 70 when a switch 104 is moved to the record position to connect the magnetic clutch 74 to the movable contact of a potentiometer 106 whose end terminals are connected between a positive D.C. voltage source and ground. The movable contact potentiometer 106 is adjusted automatically, such as by means of an electric motor 108, to gradually increase the speed of rotation as the light beam is deflected radially inward on the photosensitive element. This radial deflection is accomplished when a switch 112 is in the record position R connecting the coil 88 to the movable contact of another potentiometer 110 whose end terminals are connected to a source of positive D.C. voltage and ground. The movable contact of potentiometer 110 may also be coupled to motor 108 to gradually increase the current flowing through coil 88 causing the scanning mirror 78 to be deflected radially inward due to the increased magnetic field. In addition, the centrifugal force on weight 90 caused by the increase in speed of rotation also tends to cause a radially inward deflection of the scanning mirror. As a result, the optical scanner 44 provides a radial scan on the photosensitive element and the light pulses are recorded as a single spiral track of digitally coded light spots which are positioned in series, each successive spot being a greater distance along such track, as shown in FIGS. 5 and 5A. It should be noted that potentiometers 106 and 110 must provide a smooth changing control voltage to the magnetic clutch and the deflection coil so that wire wound potentiometers are not suitable, but a continuous resistance layer potentiometer may be employed. Also the resistance of such potentiometers may vary in a nonlinear fashion.

During the playback operation of the apparatus of FIG. 2, switch 54 is moved to the playback position to turn on the playback light source 52 and turn off recording light source 46. Also switch 64 is moved to the playback position "P" to disconnect shutter 62 from amplifier 29, and carriage 60 is moved upward into the position shown to locate the photocell 48 in alignment with the aperture in mask 98. Switches 104 and 112 are also moved to the playback positions shown. The light image of the spots on photocopy 22 are reflected from scanning mirror 78 through beam splitter 50 onto the spherical mirror 100, which reflects and also focuses such image back onto the beam splitter 50, such beam splitter again reflecting the light image through microscope 102 onto photocell 48. The photocell converts the light pulses into digitally encoded electrical pulses of current which are transmitted to ground through a load resistor 114 connected to the anode of the photocell. The digital voltage pulses thus produced across resistor 114 are transmitted to the readout circuit 36 and to a deflection control circuit.

The deflection control circuit includes an operational amplifier 116, such amplifier having a negative voltage feedback network 118 which is tuned to twice the frequency ($f_1$) of a tracking oscillator 120 whose function is hereafter described. The input of operational amplifier 116 is connected through a coupling capacitor 122 to photocell 48, and the output of such amplifier is connected to one input of a phase comparator 124 whose other input is connected to the output of tracking oscillator 120. The analog output signal of the phase comparator 124 is transmitted through an integrator circuit 126 to one input of a summing network 128, whose other input is connected through a coupling resistor 130 to the output of the tracking oscillator 120. The output signal of the summing network 128 is transmitted through an amplifier 132 and switch 112 to coil as during playback. Since the average amplitude of digital pulses integrated by the tuned feedback network transmitted to integrator 126 varies as the scanning mirror 78 moves across the track, the output voltage of the integrator 126 also varies which changes the control voltage applied to coil 88 causing gradual radially inward deflection of the scanning mirror 78 so that the mirror 78 follows the track.

The speed of rotation of the scanning mirror 78 is controlled by the output signal of a differential amplifier 134 which is applied to magnetic clutch 74 in the playback position of switch 104. One input of the differential amplifier is connected to the movable contact of potentiometer 136 whose end terminals are connected between a source of positive D.C. voltage and ground. The other input of the differential amplifier is connected across an integrating capacitor 138 whose plates are connected between the cathode of a coupling diode 140 and ground. The anode of diode 140 is connected to the output of a sync bit detector 142 forming part of the readout circuit 36. The sync bit detector 142 has its input connected to the output of photocell 148 and produces a sync output pulse when such a sync pulse occurs in the output signal of such photocell, such sync pulse being of larger amplitude than the digitally encoded pulses. These sync pulses are integrated by capacitor 138 and the resulting varying voltage is applied as the control voltage to the input of differential amplifier 134, so that the speed of rotation of shaft 70 gradually increases as the scanning mirror 78 is radially deflected inwardly in order to maintain the sync bit rate constant.

The sync pulses are produced by sync light spots recorded on the photocopy 22 between the groups of digitally encoded spots to separate such groups or words. These sync light spots may be approximately twice the diameter of the digitally encoded spots and are recorded by applying a larger voltage pulse to the electronic shutter 62 to cause more light to be transmitted through such shutter.

In order to maintain the scanning mirror locked onto the spiral track of light spots on the record element 22, the tracking oscillator 120 adds a small amplitude sine wave tracking signal to the deflection control signal applied to coil 88. The tracking signal causes the scanning mirror to oscillate back and forth across the track at a low frequency, $f_1$ for example, about 1 cycle per 100 words or 30 to 70 oscillations per revolution as such scanning mirror moves along the track. This produces a correction signal which is combined with the deflection control signal in the output signal of photocell 48, such correction signal being filtered by capacitor 122 and amplifier 116, 118 to smooth out the bit current pulses and provide the correction signal with a frequency $2f_1$ which is equal to twice the frequency of the tracking oscillator 120 due to the fact that the scanning mirror crosses the track twice for each cycle of the sine wave output signal of the tracking oscillator. This correction signal is compared with the output signal of the tracking oscillator in phase comparator 124 and if these two signals are not in phase, which indicates that the mirror has started to go off the track, the output voltage of the integrator 126 is automatically changed to position the scanning mirror back on the track.

The readout circuit 36 includes a bistable multivibrator 144 whose input is connected to the output of the photocell 48 in common with the input of the sync bit detector 142. Such bistable multivibrator may be of the Schmitt trigger type which is triggered on the leading edge of each digital pulse and reverted by the trailing edge of such pulse to produce a rectangular output pulse which is transmitted to a shift register 146. A free running bit clock pulse generator 148 is provided with its input connected to the output of the sync detector 142 to synchronize such bit clock with the sync pulses. The output of the bit clock is connected to the shift register 146 to transmit shift pulses to the shift register of the same frequency as the digital encoded signal produced by photocell 48. Once a "word" or group of digital pulses has been received by the shift register 148, they are transmitted to a storage register 150 through a transfer gate 152 which is normally nonconducting and is rendered conducting by a sync pulse applied to the transfer gate from the sync bit detector 142. The output of the storage register 150 is connected to the input of the digital to analog converter 38 which converts the digital signal into the analog output signal, such analog output signal being transmitted through amplifier 40 to the output terminal of the system. As stated previously, the analog output signal is an accurate reproduction of the analog input signal applied to converter 24.

Figure 4:
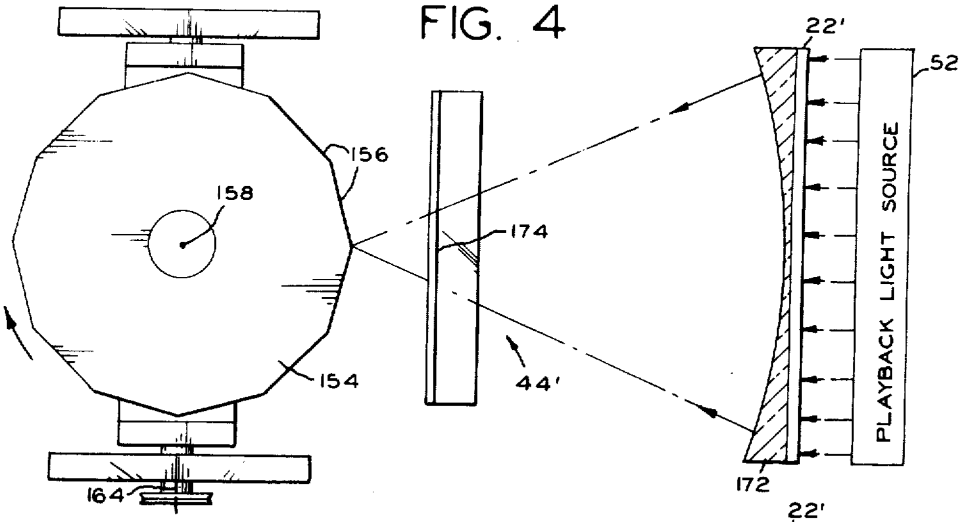
FIG. 4 is a plan view looking at the top of the optical scanner apparatus of FIG. 3.
Figure 3:
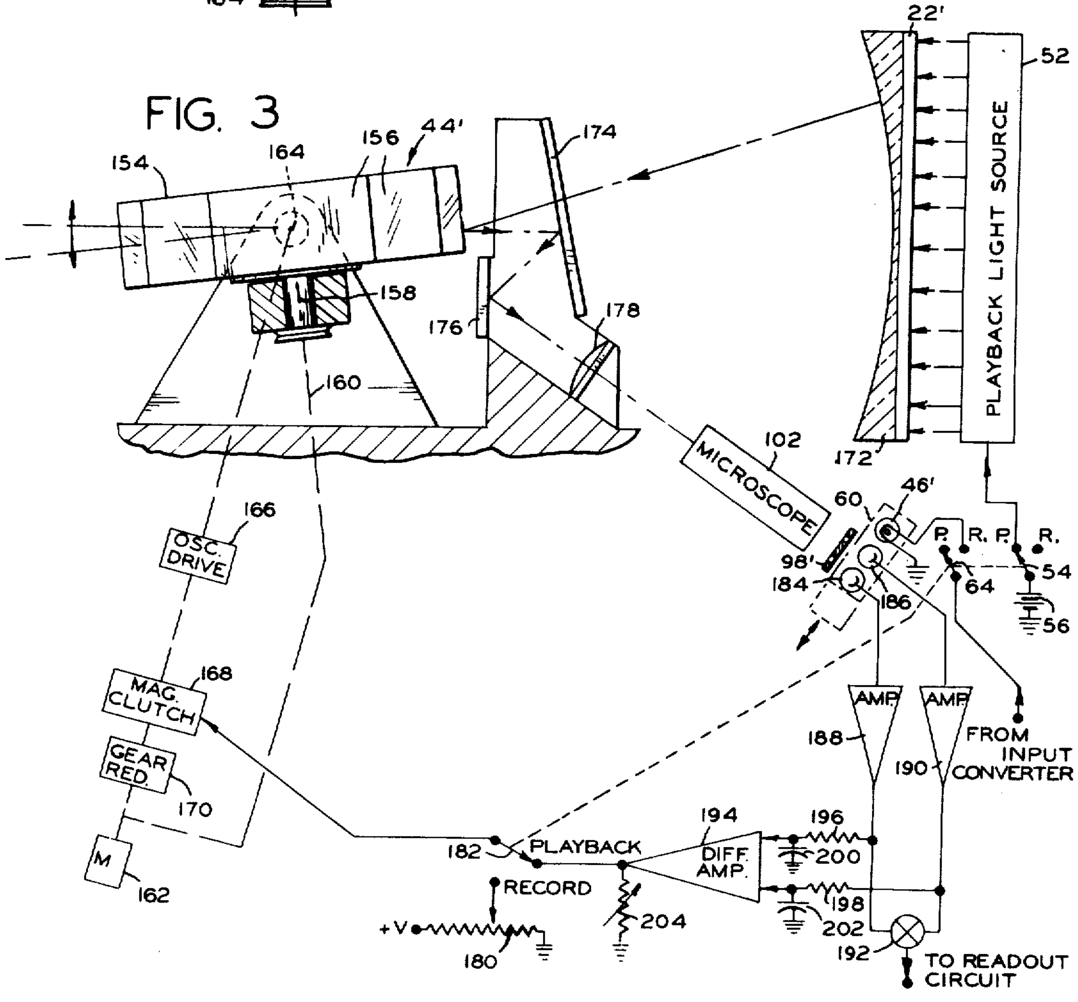
FIG. 3 is a partially schematic view of another embodiment of the system of FIG. 1, which employs an optical scanner having a mechanically oscillated rotating polygon mirror.

Another embodiment of the recording and playback system of the present invention is shown in FIGS. 3 and 4. The optical scanner 44' employed in this embodiment includes a polygon mirror 154 which may be provided with 12 flat mirror surfaces 156 radially spaced uniformly about the axis of rotation 158 of such polygon mirror. The polygon mirror 154 is rotated continuously in a generally horizontal direction about the vertical axis 158 by a direct drive 160 coupling such mirror to an electric motor 162. In addition, the polygon mirror is oscillated in a generally vertical direction about a horizontal axis 164 by means of an oscillating drive 166 connecting such mirror to motor 162 through a magnetic clutch 168 and a gear reducer 170. A flat image field corrector plate 172 in the form of a negative lens is positioned in front of the photocopy 22 to compensate for the changes in scanning distance between the mirror segments 156 and such photocopy during scanning. Thus, the correction plate is provided with a greater thickness adjacent its outer edges to compensate for the greater scanning distance between the mirror segments and the outer edge of the photocopy 22. A beam splitter 174 is positioned between the field corrector 172 and the polygon mirror 154. Another mirror 176 is positioned in the light path between the beam splitter 174 and the microscope 102. An objective lens 178 is employed between mirror 176 and the microscope, in place of the spherical mirror 100 of the embodiment of FIG. 2, for focusing.

Figure 6:
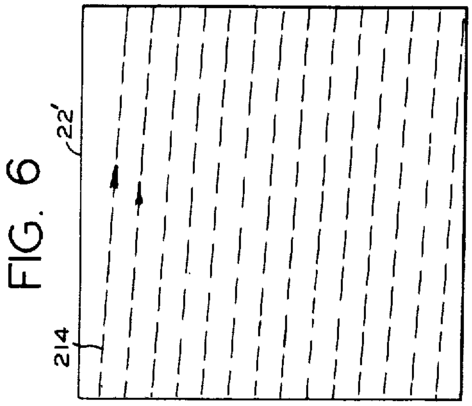
FIG. 6 is a plan view of another embodiment of a photographic record element having a rectangular raster track of digitally encoded light spots thereon which is recorded by the apparatus of FIGS. 3 and 4.
Figure 6A:
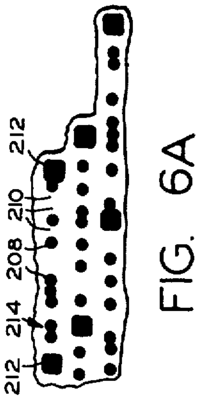
FIG. 6A is an enlarged view of a portion of the record element of FIG. 6.

The apparatus of FIGS. 3 and 4 operates in a similar manner to that of FIG. 2 during recording, except that the polygon mirror provides a rectangular scan to produce the sequential straight line raster track shown in FIGS. 6 and 6A. Thus magnetic clutch 168 is connected to the movable contact of potentiometer 180, whose end terminals are connected between a positive D.C. voltage source and ground in the record position of switch 182. It should be noted that a fixed setting of the movable contact potentiometer 180 determines the vertical scanning speed during recording. In addition, switches 54 and 64 are moved to the record position R to disconnect the playback light source 52 from power supply 56 and to connect the recording light source 46' to the output of the analog to digital converter 24 through amplifier 29. The pulsed light source 46' should be a gas discharge strobe light similar to that employed in photography, or some other light source capable of a high frequency response to enable pulsing.

During playback, the apparatus of FIGS. 3 and 4 operates in a similar manner to that of FIG. 2 except that a pair of photocells 184 and 186 are positioned in alignment with corresponding apertures in mask 98' so that the viewing fields of such photocells are located on the opposite sides of the track of light spots recorded on photocopy 22. The anodes of photocells 184 and 186 are connected through amplifiers 188 and 190, respectively, to the inputs of a summing network 192, whose output is connected to the inputs of the bistable multivibrator and the sync bit detector of the readout circuit 36 of FIG. 2. In addition, the outputs of amplifiers of 188 and 190 are respectively connected to the inputs of a differential amplifier 194 through coupling resistors 196 and 198 and integrating capacitors 200 and 202, respectively. The output of the differential amplifier 194 is connected to the magnetic clutch 168 in the playback position of switch 182 to provide a control voltage signal for such magnetic clutch which adjusts the vertical velocity of the polygon mirror to maintain the viewing fields of the detectors 184 and 186 on the opposite sides of the track in order to follow such track. Thus, as a scanning mirror, segment 156 gets off the track during playback, the output signals of the detectors 184 and 186 will be unequal and will produce a difference signal at the output of differential amplifier 194 which compensates for the error to vertically position the mirror segment back on the track. It should be noted that the D.C. output voltage of the differential amplifier 194 is equal to that of the voltage on the movable contact of potentiometer 180 when the input signals to such differential amplifier are equal, so that the vertical oscillation drive 166 moves the polygon mirror vertically at the same speed as during recording. Adjustment of the D.C. output voltage of the differential amplifier 194 may be achieved by a variable load resistor 204 connected to the output of such amplifier.

As shown in FIG. 5, the photocopy 22 of the record element produced by the apparatus of FIG. 2, has a spiral track 206 of digitally encoded information spots including opaque spots 208 recorded by light pulses which may correspond to "one" bits of a binary digital code, and transparent spots 210 which correspond to the "zero" bits of such binary code. The spots 208 and 210 each have a diameter less than approximately 0.01 millimeter and typically on the order of 1/300 millimeter. In addition, synchronizing spots 212 are provided on the track between successive word groups of digitally encoded information spots and are distinguishable from the information spots such as by being of different size. Thus, in the embodiment of FIG. 5A, one word group equals 15 binary bits which in the topmost line of the track consists of 8 transparent spots and 7 opaque spots. The sync spots 212 are approximately twice the diameter of the opaque digital spots 208 and the spacing between the centers of adjacent lines of spots is also equal to approximately twice the diameter of the opaque digital spots 208, so that adjacent sync spots will almost touch.

The rectangular raster track 214 of digitally encoded spots on the photocopy 22' produced by the apparatus of FIGS. 3 and 4 forms a sequential straight line path back and forth across the record element which is scanned as a single track. It should be noted that adjacent lines of such track are sloped downward due to the continuous vertical movement of the polygon scanning mirror 154. Also it should be noted that the top of the next successive line corresponds with the bottom of the preceding line because adjacent lines are scanned by successive mirror segments 156 of the polygon mirror. The size and spacing of the opaque and transparent digitally encoded spots 208 and 210 of FIG. 6A is similar to that of FIG. 5A.

The photosensitive record elements 22 and 22' may be transparent plates of glass or methyl methacrylate plastic having a layer of photosensitive material coated on one side thereof, if the playback light source is to be transmitted through such record elements in the manner of FIGS. 2, 3 and 4. However, if light reflecting photographs are employed, record elements 22 and 22' may be of any suitable dimensionally stable support material such as plastic which is provided with the photograph of the digitally encoded light tracks on its outer surface. A protective coating of plastic may be necessary over such photographs and over any photosensitive coating on a transparent plate to prevent scratching of the records during handling. In addition, it is possible that a photosensitive glass can be employed to form the record element without the need for a separate layer of photographic material, such glass being etched after it is exposed to the light pattern of the digitally encoded tracks. The etched spots may be filled with light opaque material. In this connection, it should be noted that photochromic materials may also be used.

Additionally, the playback record can be manufactured by mechanical means such as printing or embossing, or by thermal means such as by thermoplastic or material evaporation techniques. Alternatively, the playback record can be manufactured by chemical etching such as by using photoresist techniques, for example, as set forth with reference to the glass above, but also applicable to other materials of the photoresist type.

EMBODIMENT OF FIGS. 7, 7A AND 8

A double scanning optical recording and playback system forming an alternate embodiment of the invention includes a playback unit 314 including a laser beam source 316, a negative cylindrical lens 318 for spreading a line-like laser beam 320 into a very thin, vertical, fan-shaped beam 324 which is transmitted by a microlens secondary scanner 327. The laser beam passes to a primary scanning mirror 326 where it is reflected through a photographic record plate or element 322. The light then passes through one of a secondary, vertically scanning, horizontal row of positive magnifying lenses 328 to a horizontal row of separate photocells 330 or elements of a multielement photocell. The beam projects images one line segment at a time onto the photocells of information and in some cases synchronizing bits 332 serially arranged on the element 322 in either opaque or transparent areas in segmented horizontal lines 334 segmented to form vertical columns 334'. Each column is of the effective width of the field of one of the lenses 328. That is, the track of the record is in line segments of 300 bits serially arranged, with each line segment spaced from the adjacent line segment. The bits are very small, and there are, in a typical example, 300 bits in each segment, one hundred line segments for each line, and $3 \times 10^4$ lines per record or plate 322 with the record being only a few inches in each of length and width. The lenses 328 are equal in number to the number of columns 334', and each lens is positioned directly behind one of the columns and serves to focus images of the bits of each line segment of that column onto the photocells 330. The number of photocells 330 in the row thereof is equal to the number of bits in each line segment. Thus, a row of 300 photocells is used in a typical system utilizing 300 bits per line segment, with each bit focused on a corresponding photocell or photocell element. The width of field of each lens 328 is just slightly greater than the width of each column 334' and the spacing between the columns is equal, optically, to the optical spacing between the lenses. Optically, the lenses are centered on and cover the columns, and focus the bits of each line segment on the row of photocells.

The plate 322 is held in a stationary holder 340 and the lens matrix is mounted on a carrier plate 342 supported by pairs of pinion sets 344 and 346 movable along vertical guide rack pairs 348 and 350 by a stepping motor 352 driving the lower pair of pinion sets 346 through reduction gearing 354. Each time the motor 352 is pulsed by a master oscillator 356, the lenses are moved vertically from one line 334 to the next line. A typical frequency of this vertical scanning is 10 steps per second which, of course, covers 10 lines. A diaphragm plate 358 has a horizontal slit 360 of a width just sufficient to pass the image of one of the lines 334.

In the horizontal scan, the mirror 326 is swept by a galvanometer type motor 361 at, typically, five Hertz, and after each horizontal sweep, or half cycle, the stepping motor 352 steps the lenses one line, so that there is horizontal scanning in both directions of sweeping of the beam 324. The row of photocells 330 is illuminated once for each illumination of one of the lenses, and three hundred bits are detected thereby.

Each set of the readings from the photocells 330 can be transmitted through a line 369 to a recirculation register 370. The data from the photocells goes into buffer circuits 371 and 374 successively through transfer gates 372 and 372', and is transferred to the loop including shift register 376 through a loop load register 378 wherein the information is rapidly recirculated, i.e. so the loop contents regenerate in one output word time. The data from the shift register loop is transferred through a loop unload register 380 via transfer gate 382 and a buffer 384 to a digital to analog converter or the like.

The shift register circuit also includes a load logic circuit 386 and a counter circuit 388 by means of which loading is logically controlled in a conventional manner. The double buffer input enables two words to be added at once when necessary.

In the operation of the shift register circuit, the incoming words are added to the loop and earlier words are transferred out. The loop time is fast, as stated, so the entire contents regenerate in one output word time. This allows essentially asynchronous input, but synchronous output. Therefore, when audio information and the like has been recorded, the information can be read out in uninterrupted fashion and applied to a D to A converter where the audio is reproduced.

It will be seen that words can be rapidly added to the shift register loop, with one or two new words added upon each circulation until the loop is nearly filled. This read in of information will occur as a column of the photographic record is being scanned horizontally. As horizontal scanning is taking place between columns, i.e. where no information is located, naturally no information is loaded into the shift regisiter loop. Transfer gate 382 is timed to read out the words successively from the loop, at the slower "average" output rate, and will "catch up" as the scanning between columns occurs. Then the input of information via the input buffers will again resume.

Figures 7, 7A, 8, 9, 9A:
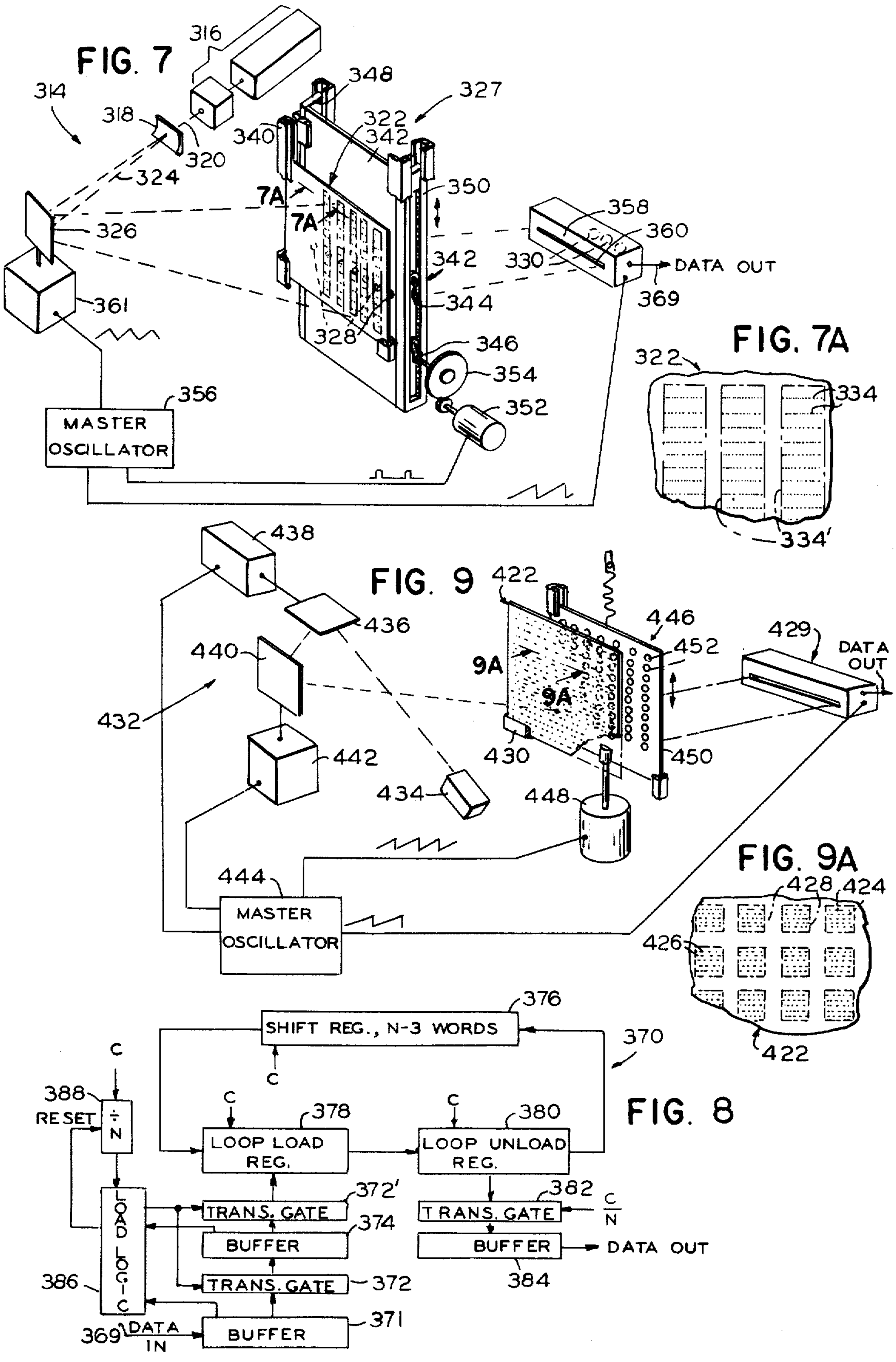
FIG. 7 is a partially schematic view of an optical recording and playback system forming an alternate embodiment of the invention.
FIG. 7A is a greatly enlarged portion of a photographic record element of the system of FIG. 7.
FIG. 8 is a block diagram of a recirculating register of the system of FIG. 7.
FIG. 9 is a partially schematic view of an optical recording and playback system forming an alternate embodiment of the invention; and, FIG. 9A is a greatly enlarged portion of a photographic record element of the system of FIG. 9

It will be understood the circuit of the FIG. 8 type is suitably employed at the location of readout circuit 36 in FIG. 2, when asynchronous data is being read. "C" corresponds to the required word shift rate of the shift register loop circuit. It is generated by a stable oscillator, not shown. The total capacity of the loop is N−1 words, N. is the interruption length in words, B is the interruptions per second, the input rate during load is C/N + BN, and the average rate input is equal to the output which is C/N.

In recording, in place of the three hundred photocells 330, a row of three hundred light cells is used, the cells being illuminated or dark according to a line segment of information to be recorded, a diaphragm means exposing only one of the lenses 328 at a time. The diaphragm means horizontally scans an unexposed photographic element or card 322 held by the holder 340, and the row of lenses are then stepped one line vertically at the end of each scan.

It is contemplated that, in a typical example, each column 334' would be about 1 mm wide, and would extend the full height of the record 323. The horizontal spacing between columns would be 0.2 mm, the bits would be arranged in rows in each column, about 300 bits per row, and 300 rows per mm of column height, and there would be 100 columns each 10 cm long, giving $9 \times 10^8$ bits on the record. The primary scan of the laser beam 324 would illuminate only one column at a time. Since the optical and mechanical resolution at the record need be only ±0.2 mm or so, many different types of equipment can be employed. The secondary scanner consists of two major elements: a row of 100 of the lenses 328, and the photocells 360, which may be in the form of three hundred photocells or a 300 element photocell device. The lenses are arranged so that each column will be imaged on the photocells by one lens when the column is illuminated. As the secondary scanner moves vertically, each row of bits in the selected column will be imaged on the photocells by the lens directly behind the row, the lens imaging each bit on one of the elements of the photocell. The 300 photocells would be read out electronically. The secondary scanner is incrementally moved one row at a time, and the primary scanner is swept back and forth continuously.

EMBODIMENTS OF FIGS. 9 AND 9A

A double scanning optical recording and playback system forming an alternate embodiment of the invention includes a photographic record plate or element 422 in which information bits 424 are arranged in rows 426 arranged in square blocks or pages 428. The record is held in a fixed position by a holder 430, and is scanned by a primary scanner 432 including a laser beam source 434, a vertical scan mirror 436 driven by a stepping motor 438 and a horizontal scan mirror 440 driven by a stepping motor 442, both controlled by a master oscillator 444. The oscillator 444 also actuates a secondary scanner 446 including an oscillating motor 448 to move a holder 450 up and down in a scan and return. The holder 450 holds lenses or lenslets 452, each optically directly behind one of the pages 428 with the effective width of field of each lens being as great as the width of the page 428. As the lens behind the illuminated page is moved in its vertical scanning stroke, that lens images seriatim the line segments of the page on the photocells 429 like the photocells 330, each of the bits on that line being imaged on a different one of the photocell elements. After reading out all line segments on a particular page the beam is stepped to the next page in series by motors 442 and 438, and the lenses moved back again vertically for scanning that next page.

In a typical example, the information on the record is organized in blocks or pages of about 1 mm square. There are 100 × 100 such pages on the record. The bits are arranged in rows as before, i.e. 300 bits per row, and now three hundred rows per page. The first element of the secondary scanner has 100 × 100 lenslets, but the photocell array is the same (300 bits long). The secondary scanner oscillates vertically with an amplitude of 1 mm (actually slightly less), thus scanning all pages at once onto the photocell string. The primary scanner increments in two dimensions to select the required page. In this system it would be feasible to use a cathode ray tube, a single fiber scanner, or a light emitting diode matrix (100 × 100) as the primary scan. In these cases it would be more practical for the primary scan to address all pages ($10^4$) between line increments, thus providing very high data rates.

For audio, the required bit rate is of the order of 3 × $10^5$ bits/second. With 300 bits/row, about 1000 rows per second must be scanned. The secondary scan must oscillate at 1.7 Hz., and the primary must increment at 3.3/second. If a CRT or light emitting diode (LED) matrix is used, the secondary must increment at 10 sec intervals. For TV applications, the bit rate must be more like $10^7$ bits/sec, or about 30X faster. The FIG. 9 system only needs 3/sec increments in the secondary scanner. The lenslet quality need not be very good. Typical molding techniques are ordinarily satisfactory. Zone plates (point holograms) or fiber bundles may be entirely satisfactory for this purpose.

In recording, an unexposed photographic card or element 422 is placed on the holder 430, and a diaphragm means having a diaphragm opening one page in size may be mounted on the element 450 for horizontal scanning of pages. The diaphragm means is scanned horizontally from lens to lens (page to page) and scanned vertically from one horizontal row of pages to the next after each horizontal row of pages has been recorded. 300 light sources are placed in the positions of the photocells, and the diaphragm means exposes one bit area on the photographic element from one of the sources at a time.

What is claimed is:

1. Optical scanner apparatus comprising:
a rotatable support,
a resilient arm member fixed at one end to said support,
a mirror attached to said arm member,
motor means for rotating said support,
deflection means for bending said arm member in response to an electrical control signal to radially move said mirror during rotation of said support in order to provide the mirror with a spiral-shaped scan track on an image plane, and
compensation means for moving said mirror away from the image plane as said mirror is deflected radially inward along said scan track in order to maintain the optical path length between the mirror and the image plane substantially constant during scanning.

2. Scanner apparatus in accordance with claim 1 in which the deflection means includes an electromagnetic means for bending said arm member.

3. Scanner apparatus in accordance with claim 1 in which the motor means includes control means for varying the speed of rotation of said support so that the speed increases as the mirror is moved radially inward.

4. Scanner apparatus in accordance with claim 1 in which the arm member is a leaf spring and the mirror is attached to the leaf spring at a position aligned with the axis of rotation of the support.

5. Scanner apparatus in accordance with claim 4 in which the compensation means includes a weight attached to the free end of the spring on the opposite side of the axis of rotation from its fixed end.

* * * * *